Nov. 26, 1929.  A. HELFENSTEIN  1,737,011
MEANS FOR DRIVING POWER OPERATED VEHICLES, PARTICULARLY AIRCRAFT
Filed June 9, 1925
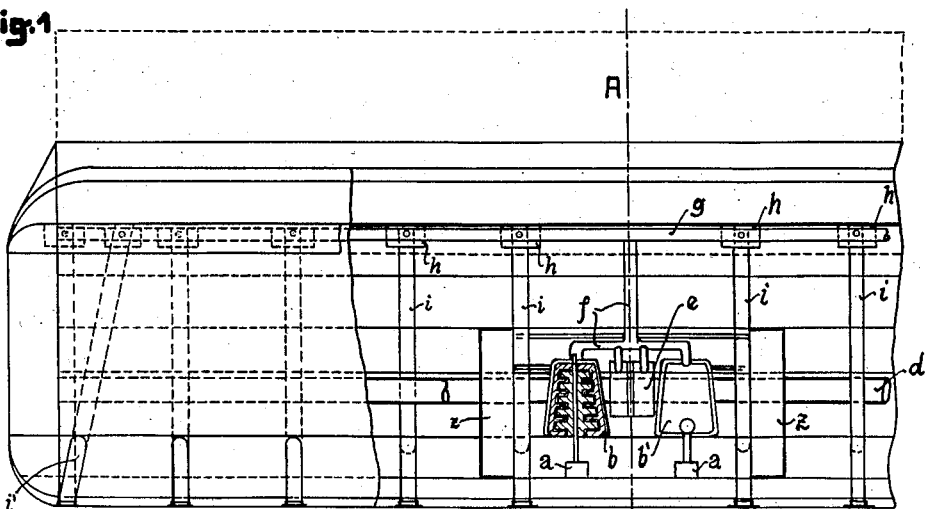
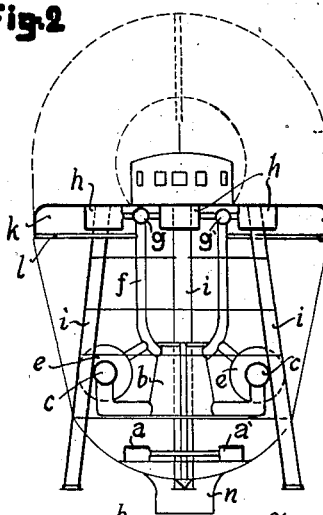
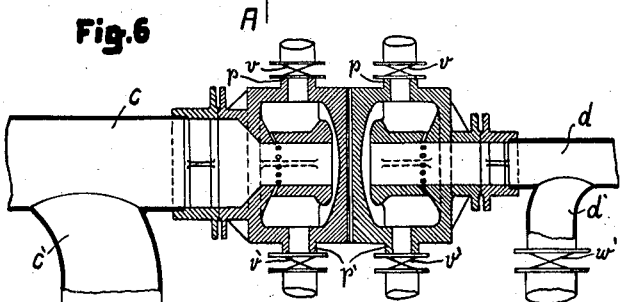
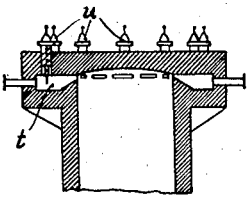
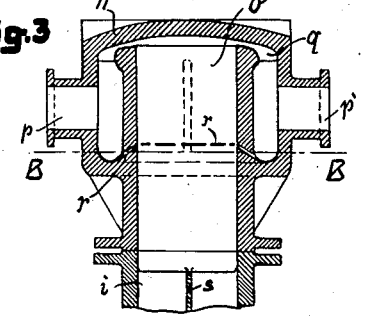
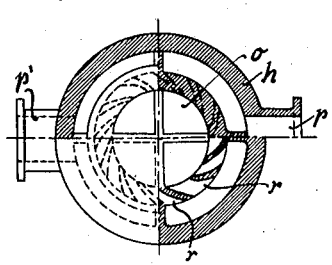
Inventor
Alois Helfenstein
By B. Singer
Atty.

Patented Nov. 26, 1929

1,737,011

UNITED STATES PATENT OFFICE

ALOIS HELFENSTEIN, OF VIENNA, AUSTRIA

MEANS FOR DRIVING POWER-OPERATED VEHICLES, PARTICULARLY AIRCRAFT

Application filed June 9, 1925, Serial No. 36,039, and in Austria April 18, 1925.

This invention relates to improvements in means for driving power operated vehicles and has for its object to provide devices wherewith to utilize the repellent action of compressed gases for the upward propulsion or raising, steering, stabilization and the like of vehicles, particularly aircraft and gliders, thereby avoiding the use for that purpose of mechanical devices such as steering and lifting planes, screw propellers, or of gases which are lighter than air.

In the accompanying drawing is shown an example of an arrangement for carrying out the method according to the invention on an aircraft.

Figure 1 shows a portion of the air craft in side elevation, partially in longitudinal section; Figure 2 is a section on the line A—A of Figure 1; Figure 3 is a vertical section of a compression chamber with the pressure pipe attached and the arrangement of nozzles; Figure 4 is section on the line B—B of Figure 3; Figure 5 is a constructional form of the nozzle with the explosion chamber and Figure 6 is a longitudinal section of the arrangement of horizontal suction and pressure pipes with operating devices for travelling forwards and backwards.

In the drawing $a$ $a'$ denotes the motors, $b$ $b'$ the two turbo compressors driven by the motors, $c$ the suction pipe, $d$ the parallel pressure pipe for forward movement, $e$ the compression chambers for the pressure pipes, $f$ the pressure pipes leading from the compressors for upward propulsion, $g$ the horizontal distributing pipes therefor, $i$ the upward propulsion pressure pipes some of which (see Figure 2 and $i'$ Figure 1) are set obliquely, $k$ $k'$ are the horizontally projecting compressed air chambers, $l$ $l'$ the horizontal air compression pressure pipes, $m$ the inflatable balloon envelopes ready for inflation and $z$ the compressed air reservoirs.

In Figures 3, 4 and 5 $o$ denotes the compression space of the compression chamber, $p$ $p'$ the compressed air supply pipes to the compression chamber, $q$ the upper annular jet, $r$ the lower ring of nozzles with the nozzle slots pointing tangentially upwards, $s$ is the division wall in the pressure pipes, $t$ is the explosion chamber arranged in front of the nozzle slot, $u$ are the sparking plugs.

Finally as shown in Figure 6 cut off devices $v$ $v'$ are provided on the air inlets $p$ $p'$ of the chambers, and the suction and pressure pipes $c$ $d$ are provided with branch connections $c'$ $d'$, the said branch connections leading to the compressors and the branch connection $d'$ being adapted to be connected according to requirements with the suction of the compressors.

To produce the repellent pressure required, compressed air is primarily employed, which is generated on the vehicle itself in piston or turbo compressors $b$ and compressed under the cover of a compression chamber $e$ from which it expands into pressure pipes connected thereto. These pipes are open at one end and for the propulsion of the vehicle approximately horizontal, while those used for raising the vehicle are arranged vertically. They may be telescopically extensible and form together with the chambers, the principal supporting elements of the machine. The compressed air generated is conducted into the compression and compressed against the covers of the chambers, produces pressure against the walls of the chambers, generates eddies and heat and then expands in the pipes which operate as jet propellers and are open ended for the compressed air to escape therefrom. The compressed air passes through the nozzels $r$ and $q$ below the covers of the chamber $h$ and then expands into the tubes $i$ and $d$ and escapes through the open ends of said tubes. Hence according to the direction (i. e. the position of the pipes) a powerful upward or forward driving pressure or both is produced. The compressing chambers are placed at such a height that their tops lie considerably above the centre of gravity of the vehicle so as to allow the upward driving force of the compressed air to set above the centre of gravity even under severe fluctuations or deviations of the vehicle from the normal whereby the stabilization of the vehicle vertically is assisted and the pipes may be of such a length that they will afford the compressed air sufficient guidance for the favourable working of the expansion.

The reduction of the velocity of expansion of the compressed air is of the greatest importance for reasons of economy in compressed air and power. The velocity depends on the pressure in the compression chambers, on the resistance of the walls of the chambers and pipes and on the resistance offered by the outer air situated beneath the pipes. It is therefore important above all things to reduce the velocity of expansion so far as the consumption of compressed air is concerned. This retardation of expansion is obtained by the use of vertical division walls S in the pipes, which also serve to stiffen them. The velocity of the expansion of the air may also however be produced by compressed air or the pressure of the expansion, that is to say by counter force, or back pressure. For this purpose nozzles r are provided in the compression chambers through which compressed air, or gasses of combustion are blown toward or transversely off the air expanding from the cover. The retarding devices may be placed both in the chamber and in the pipes connected thereto.

The tangentially directed nozzles induce a one-sided formation of eddies, whereby a strong braking action is exerted on the expansion.

In order to increase the action of the pressure, fuel may be mixed with the compressed air in suitable manner and the mixture may be caused to explode by ignition or non-explosive combustion may be induced by high pressure. This is shown in Fig. 5.

The upward propulsion or raising of vehicle is produced mainly by a difference in pressure from the pressure against the cover of the compression chamber as compared with the pressure above the vehicle and by the actions of the vis viva of the air (or gases) their expansion and emergence from the chambers and pipes respectively consequently by the pressure against the ground or the surface of the water in the case of gliders and against the outer air situated in rear of the vehicle in the case of air craft.

The compressed air motors are arranged in pairs and in opposite directions in order to avoid one-sided horizontal forces.

The propulsion forwards is obtained likewise by means of compressed air and fuel in approximately horizontal chambers and compressed air pipes connected thereto.

To ensure stability the heavy motors and compressed air compressors also the material for driving them are placed in the lower part of the machine, thus keeping the centre of gravity low. The compressors may be constructed as vertical rotors, so as to assist in maintaining the stability of the machine by their gyroscopic action. The suction pipes of the compressors lead vertically through the machine as chimneys to the outer air or horizontally to the front end of the machine so as to use the suctional pressure for upward or forward propulsion.

To ensure that compression shall work without shock the vehicles are provided with compressed air reservoirs which act as buffers and which are made of such dimensions that should generation of compressed air fail there shall be a sufficient reserve of compressed air to enable landing to be quickly effected.

The outlet ends of the vertical pipes may be each provided with a telescopic hose, a jacket or the like of dense flexible material such as fabric, leather, rubber or the like, which when starting trails over the lower surface and thereby enables the machine to rise rapidly and without shock from the ground or surface of the water, without a great expenditure of power and also allows when descending within a few meters of the ground, a sufficient brake pressure to ensure a slow landing without shock. A suitable use of the jacket also affords the possibility of conveying greater loads by means of air or surface water craft also for driving power sledges without any great loss of compressed air.

In order to assist the stabilization of vehicle rigid gas cells filled with gas lighter than air or the like or inflatable envelopes may be arranged at the upper end of the machine which are blown up as may be needed with compressed air and the use of which can assist the stability by increasing the resistance of the air. During flight they act as supporting surfaces which effect an increase in the capacity of the vehicle, but may also be provided with high pressure nozzles, in such a manner that they will produce ascent and forward motion and the same time act as stabilizers. Maintenance of the stability may also be effectively assisted by arranging the vertical pressure pipes in pairs and inclined slightly relatively to each other.

The normal steering of the vehicle may likewise be effected by compressed air. For the purpose the pressure pipes or the suction pipes of the compressors are provided with branches as shown in Fig. 6, and means for shutting off provided with valves v v or the like in such a way that lateral steering and also vertical steering and the maintenance of the stabilization under sharp squalls can be effected by blowing out or drawing air at suitable points. It is obvious of course that steering planes may also be provided as an assistance of a reserve.

The machines fitted according to the present method may be used both as air vehicles pure and simple also as surface water craft, sledges, gliding boats and wheeled vehicles. In the case of air craft the pressure pipes may also be constructed as landing supports while for descending on the surface of water a water tight bottom may also be provided.

Mechanical driving devices may be provided on the machine as addition or reserve devices and additional gyroscopes may be provided for stabilizing purposes.

The cooling of the circulating water for compressor and the like is suitably effected by a refrigerating machine.

Having now particularly described and ascertained the nature of my invention and in what manner the same is to be performed, I declare what I claim is:

1. Means for driving vehicles by repellent action of compressed air comprising compression chambers in which compressed air is blown, a pipe connected with said chambers and in which the compressed air expands and annular nozzles beneath the covers of the compression chambers.

2. Means for driving vehicles by repellent action of compressed air comprising compression chambers in which compressed air is blown, a pipe connected with said chambers and in which the compressed air expands and annular nozzles beneath the covers of the compression chambers, said nozzles being constructed in front of their outlets as combustion chambers in which the mixture of compressed air and fuel is brought for explosion prior to its admission into the compressed air chambers.

3. In means for driving vehicles by repellent action of compressed air, the combination of compressors, compression chambers, pipes in connection thereof and telescopic jackets on the outlets of the pipes substantially as described and illustrated.

4. In means for driving vehicles by repellent action of compressed air the combination of compressors, compression chambers, pipes in connection thereof, lateral projections, inflatable balloon envelopes on the top of the vehicle, reservoirs for the accumulation of compressed air and jackets on the outlets of the vertical pipes substantially as described and illustrated.

In witness whereof I affix my signature.

ALOIS HELFENSTEIN.